United States Patent Office 2,729,555
Patented Jan. 3, 1956

2,729,555
METHOD OF OPERATING BLAST FURNACES

Earl H. Shipley, Pittsburgh, Pa.

No Drawing. Application June 5, 1952,
Serial No. 291,980

1 Claim. (Cl. 75—5)

This invention relates to the method of operating blast furnaces for the smelting of iron ore and the like, and it is among the objects thereof to utilize an oxygen enriched blast with steam or water vapor to provide reducing gases for reaction with the ore at levels higher in the furnace.

It is a further object of this invention to augment the beneficial effects of oxygen injection in the blast by injecting into the furnace a hot reducing gas to maintain all the conditions needed for satisfactory furnace operations.

It is a further object of the invention to provide for variations in the burden of the furnace whereby less coke and more ore may be charged to increase the smelting capacity of the furnace.

It is a further object of this invention to provide for an increase in the driving rate of the furnace whereby an increased quantity of material may be passed through the furnace in a given period of time, thereby increasing the smelting capacity of the furnace.

I am aware that heretofore it has been proposed to inject reducing gases in blast furnaces, but no temperatures or compositions of suitable gases have been specified. Furthermore these cases generally related to the injection of reducing gases in the air blast to the furnace, rather than at a different location and by independent means.

In accordance with the present invention the operation of the blast furnace is similar to conventional operations except that the blast of the furnace is enriched by adding to the air, normally containing 20.8 per cent oxygen, a quantity of gas consisting of substantially pure oxygen or at least from 75 to 80 per cent oxygen. The addition to the blast of the furnace of rich or virtually pure oxygen results in the generation of higher temperatures in the melting zone of the furnace and in the tuyère portion of the furnace. The heat given off by burning coke serves to raise the temperature of the gases in this portion of the furnace to a substantial degree higher than if combustion air containing the normal quantity of oxygen is employed.

Normal blast furnace air contains approximately four cubic feet of nitrogen for each cubic foot of oxygen and this nitrogen is heated by the combustion of coke. By adding a substantial portion of oxygen to the blast in the form of pure oxygen up to 5 per cent by volume, no equivalent amount of nitrogen is added and the resulting temperature of the products of combustion is raised proportionately higher.

However, in order to maintain the temperatures in the melting zone within the limits of the melting temperature of the refractories, it is necessary to provide means for absorbing the heat released by the combustion of coke. This may be accomplished by utilizing steam or water vapor which is added to the blast in an amount up to 10 grains of water vapor per cubic foot of blast proportionate to the quantity of oxygen introduced into the blast. The resulting reactions are endothermic in nature and provide reducing gases for reaction with the ore at levels higher in the furnace. The steam of water vapor injections into the blast augment the beneficial effects of oxygen injection while preventing damage to the furnace structure.

As a further step in maintaining all conditions needed for satisfactory furnace operations, it has been found desirable to inject into the furnace hot reducing gases in addition to the quantity of steam or water vapor, consisting preferably of a mixture of carbon monoxide and hydrogen at temperatures above 2300° F., ranging to 2600° F. or higher. The injection of such reducing gases results in the fullest benefit of oxygen enrichment of the blast. The ideal reducing gas mixture would be hydrogen and carbon monoxide. This mixture would require generation of the gases, cooling them and removing the water vapor and $CO_2$ normally produced, requiring the use of extra equipment, and then reheating the remaining reducing gases. This would result in an increase in the cost of production of these gases. It is found, however, that suitable gases for this use may be manufactured from either coke oven gas or natural gas, and a suitable composition has been used of about 55% to 65% hydrogen; 23% to 35% carbon monoxide; 5% to 15% water vapor; 1% to 5% carbon dioxide, and 1% to 4% residual methane. The hot reducing gases are injected preferably at or above the start of the melting zone of the furnace, which is approximately just above the mantle portion of the blast furnace.

It is apparent from the above description of the invention that the enrichment of blast furnace blasts by the addition of pure oxygen and with the addition of steam or water vapor, increases the smelting capacity of the furnace, and that by the injection of hot reducing gases at or about the melting zone of the furnace, all the conditions favorable for satisfactory blast furnace operations are maintained and the smelting capacities shall be still further increased.

Although one embodiment of the invention has been herein described, it will be evident to those skilled in the art that various modifications may be made in the proportions of the oxygen and water vapor and the temperature and composition of the hot reducing gases without departing from the principles herein set forth. Also, the injection of the hot reducing gases at the melting zone of blast furnaces may be advantageously used without oxygen enrichment of the blast or without the injection of water vapor in the blast.

I claim:

The steps in the method of operating blast furnaces which comprise preparing the blast of the furnace by the addition of a quantity of pure oxygen up to 5 per cent by volume and the injection of steam in the blast up to ten grains of water vapor per cubic foot of blast proportionate to the quantity of oxygen introduced into the blast to provide reducing gases for reaction with the ore at levels higher in the furnace, and injecting hot reducing gases at temperatures above 2300° F. comprising a mixture of carbon monoxide and hydrogen of the composition of 55% to 65% hydrogen; 23% to 35% carbon monoxide; 5% to 15% water vapor; 1% to 5% carbon dioxide, and 1% to 4% residual methane, at a point above the melting zone of the furnace.

References Cited in the file of this patent

UNITED STATES PATENTS

| 342,607 | Kendall | May 25, 1886 |
| 1,518,854 | Kirby | Dec. 9, 1924 |
| 2,420,398 | Kinney | May 13, 1947 |
| 2,560,471 | Platon | July 10, 1951 |
| 2,593,257 | Bradley et al. | Apr. 15, 1952 |

FOREIGN PATENTS

| 7,556 | Australia | May 30, 1927 |